3,406,024
METHOD FOR THE CONTROL OF WEEDS
Sidney B. Richter and David P. Mayer, Chicago, Ill., assignors to Velsicol Chemical Corporation, Chicago, Ill., a corporation of Illinois
No Drawing. Continuation-in-part of application Ser. No. 208,904, July 10, 1962. This application Aug. 27, 1965, Ser. No. 483,323
13 Claims. (Cl. 71—98)

This application is a continuation-in-part of patent application Ser. No. 208,904 filed July 10, 1962, now abandoned. This invention relates to the control of pests with novel pesticidal compositions. More specifically, this invention relates to the method for the control of weeds which comprises contacting said weeds with a herbicidal composition comprising an inert carrier and as the essential active ingredient, in a quantity which is toxic to said weeds a compound of the general formula

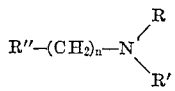

wherein $n$ is a whole number from 1 to 3; R and R' are selected from the group consisting of lower unsubstituted alkyl, lower unsubstituted alkenyl, lower monohydroxyalkyl, and hydrogen, a maximum of one of R and R' being hydrogen; and R" is a phenyl radical containing substituents selected from the group consisting of lower unsubstituted alkyl, lower unsubstituted alkoxy, lower unsubstituted alkylmercapto, halogen, mercapto, nitro, hydroxy, and amino, provided that one substituent on the phenyl radical is halogen when one lower unsubstituted alkoxy substituent is present on the phenyl ring, and provided that a maximum of three substituents on the phenyl ring are hydrogen when one substituent on the phenyl ring is nitro. By lower alkyl, lower alkenyl, and lower alkylmercapto are meant those groups containing up to four carbon atoms.

The chemical compounds useful in the pesticidal compositions according to this invention can also be represented by the following general formula

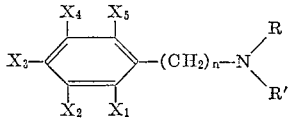

wherein $n$, R and R' are as defined above and $X_1$, $X_2$, $X_3$, $X_4$, and $X_5$ are selected from the group consisting of lower unsubstituted alkyl, lower unsubstituted alkoxy, lower unsubstituted alkylmercapto, halogen, mercapto, nitro, hydroxy, and amino, provided that one of $X_1$, $X_2$, $X_3$, $X_4$, and $X_5$ is halogen when one of $X_1$, $X_2$, $X_3$, $X_4$, and $X_5$ is lower unsubstituted alkoxy and provided that a maximum of three of $X_1$, $X_2$, $X_3$, $X_4$ and $X_5$ are hydrogen when one of $X_1$, $X_2$, $X_3$, $X_4$, and $X_5$ is nitro.

In a preferred embodiment of this invention, the compounds useful in the pesticidal compositions of this invention will have on the phenyl ring a maximum of two lower unsubstituted lower alkoxy groups, a maximum of two lower unsubstituted alkyl groups, a maximum of two nitro groups, a maximum of two amino groups, a maximum of two hydroxy groups, a maximum of two lower unsubstituted alkylmercapto groups, and a maximum of two mercapto groups.

Typical examples of chemical compounds which are useful in the compositions for the pest control method of this invention are such substances as N,N-diethyl-3-bromo-4-methoxybenzylamine,
N-ethyl-3-bromo-4-methoxybenzylamine,
N,N-diethyl-3-fluoro-4-methoxybenzylamine,
N,N-diethyl-2-methoxy-5-chlorobenzylamine,
N,N-dimethyl-2-bromo-4-methoxybenzylamine,
N-butyl-3-methoxy-2-bromobenzylamine,
N-ethyl-3-methoxy-2-fluorobenzylamine,
N-isobutyl-3-methoxy-2-bromobenzylamine,
N-isopropyl-3-methoxy-2-chlorobenzylamine,
N-isobutyl-2-butoxy-3-bromobenzylamine,
N-butyl-2,4-dichlorobenzylamine,
N-sec-butyl-3,4-dichlorobenzylamine,
N,N-dimethyl-p-chlorobenzylamine,
N-ethyl-p-chlorobenzylamine,
N,N-diethyl-m-methylbenzylamine,
N-ethyl-3-methoxy-4-fluorobenzylamine,
N,N-dimethyl-3-methoxy-4-fluorobenzylamine,
N(alpha),N(alpha)-diethyltoluene-alpha, 4-diamine,
N,N,-diethyl-p-aminophenethylene,
N,N-dimethyl-2,5-dimethoxyphenethylamine,
N,N-dimethyl-m-methoxyphenethylamine, and the like.

Many of such compounds useful in the compositions according to this invention are known in the art. These and other similar compounds can be obtained, for example, by the condensation of compounds of the formula

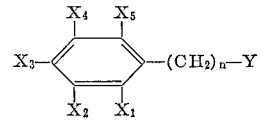

wherein Y is chlorine or bromine and N, $X_1$, $X_2$, $X_3$, $X_4$, and $X_5$ are as defined above, with amines HNRR', wherein R and R' are also as defined above. The starting materials of the structural formula given comprise the appropriately substituted benzyl, phenethyl, and propylbenzene chlorides or bromides. Typical examples of such compounds useful in the preparation of active compounds for this invention include 2-chloro-6-nitrobenzyl bromide, 3,5-dinitrobenzyl bromide, p-butylbenzyl chloride, 2,4-dinitrobenzyl chloride, p-ethylbenzyl chloride, 3,5-dimethoxybenzyl chloride, 2,6-dichlorobenzyl bromide, 2-chloro-5-nitrobenzyl chloride, 2-nitro-5-chlorobenzyl chloride, 2,5-dimethoxybenzyl bromide, 2,6-dimethoxybenzyl chloride, p-butylbenzyl chloride, 3,4-diethoxybenzyl chloride, p-bromobenzyl chloride, 2-ethyl-5-nitrobenzylchloride, o-propylbenzyl chloride, 2-ethyl-4-nitrobenzyl chloride, 4-ethyl-2-nitrobenzyl chloride, 2-methoxy-5-chlorobenzyl chloride, 3-bromo-4-methoxybenzyl chloride, 2-methyl-4-methoxy-5-nitrobenzyl chloride, 2-methoxy-5-nitrobenzylchloride, o-aminobenzyl chloride, 4-(methylthio)-benzyl chloride, 4-chlorophenethyl chloride, 2-chloro-5-methoxyphenethyl bromide, 3-chloro-4-methoxyphenethyl bromide, 2-fluoro-4-methoxyphenethyl bromide, 4-tert-butylphenethyl bromide, 3-ethylphenethyl bromide, 1-(3-bromopropyl)-4-tert-butylbenzene, o-hydroxybenzyl chloride, 3,5-dibromobenzyl bromide, 2,4,6-tribromobenzyl bromide, and the like.

Suitable reactants of the formula HNRR' include a wide variety of primary and secondary amines wherein R and R' are as defined above. Some typical suitable reactants are, for example, isopropylamine, di-n-propylamine, dimethylamine, ethanolamine, methylamine, diethylamine, di-tert-butylamine, allylamine, diallylamine, 4-amino-1-butanol, 3-amino-1-butanol, diethanolamine, methylethylamine, and the like.

When the condensation reaction to form compounds for this invention is carried out, at least two moles of the amine should be used for each mole of the chloride or bromide, since the hydrogen halide released during the reaction is taken up by some of the free amine. The reaction can be carried out conveniently by heating the reactants, preferably in an inert solvent such as benzene or toluene. The exact reaction temperatures are not critical, since the reaction will often take place at normal room temperature; however, temperatures which are the normal reflux temperature of the reaction mixture are preferred. The reaction will often be complete in a few hours. Generally, a precipitate of amine hydrochloride or hydrobromide will form in the reaction mixture and can be filtered off. The product can be isolated from the reaction mixture by ether extraction; and it can be purified by crystallization, fractional distillation, or other techniques known to the art.

Some typical compounds which are useful in the compositions and method of this invention and which can be prepared in the manner described above are as follows:

N-ethyl-2,4-dinitrobenzylamine
N-methyl-3,5-dimethoxybenzylamine
N,N-diethyl-2,6-dichlorobenzylamine
N,N-diethyl-2-chloro-5-nitrobenzylamine
N,N-dimethyl-2-ethyl-5-nitrobenzylamine
N-isopropyl-2-methoxy-5-chlorobenzylamine
N,N-diisopropyl-4-(methylmercapto)benzylamine
N-propyl-2-chloro-5-methoxyphenethylamine
N,N-dipropyl-3-chloro-4-methoxyphenethylamine
N-butyl-4-tert-butylphenethylamine
N-allyl-o-hydroxybenzylamine
N,N-diallyl-2,4,6-tribromobenzylamine
N-(4-hydroxybutyl)-p-butylbenzylamine
N-(2-butenyl)-3-ethoxy-4-fluorobenzylamine
N,N-di(2-hydroxyethyl)-2-ethyl-5-nitrobenzylamine
N-isobutyl-4-chlorophenethylamine
N-ethyl-2-methoxy-5-bromobenzylamine
N-methyl-2-chloro-6-nitrobenzylamine
N,N-dimethyl-2-methyl-4-methoxy-5-chloro-
benzylamine
N-ethyl-3,5-dibromobenzylamine.

The herbicidal compositions of this invention comprise an inert carrier and a herbicidally toxic amount of a compound $R''-(CH_2)_nNRR'$ as previously defined. Such compositions, which are usually known in the art as formulations, enable the active compound to be applied conveniently to the site of the pest infestation in any desired quantity. These compositions can be solids such as dusts, granules, or wettable powders; or they can be liquids such as solutions or emulsifiable concentrates.

For example, dusts can be prepared by grinding and blending the active compound with a solid inert carrier such as the talcs, clays, silicas, pyrophyllite, and the like. Granular formulations can be prepared by impregnating the compound, usually dissolved in a suitable solvent, on to and into granulated carriers such as the attapulgites or the vermiculites, usually of a particle size range of from about 0.3 to 1.5 mm. Wettable powders, which can be dispersed in water to any desired concentration of the active compound, can be prepared by incorporating wetting agents into concentrated dust compositions.

In some cases the active compounds are sufficiently soluble in common organic solvents such as kerosene or xylene so that they can be used directly as solutions in these solvents. However, preferred liquid compositions are emulsifiable concentrates, which comprise an active compound according to this invention and as the inert carrier, a solvent and an emulsifier. Such emulsifiable concentrates can be diluted with water to any desired concentration of active compound for application as sprays to the site of the pest infestation. The emulsifiers most commonly used in these concentrates are nonionic or mixtures of nonionic with anionic surface-active agents.

Typical compositions according to this invention are illustrated by the following examples, in which the quantities are in parts by weight.

EXAMPLE 1

Preparation of a dust

N-butyl-2,4-dichlorobenzylamine _____ 10
Powdered talc _____ 90

The above ingredients are mixed in a mechanical grinder-blender and are ground until a homogeneous, free-flowing dust of the desired particle size is obtained. This dust is suitable for direct application to the site of the pest infestation.

EXAMPLE 2

Preparation of an emulsifiable concentrate

The following ingredients are blended thoroughly until a homogeneous liquid concentrate is obtained. This concentrate is mixed with water to give an aqueous dispersion containing the desired concentration of active compound for use as a spray.

N,N-diethyl-m-methylbenzylamine _____ 25
Sodium lauryl sulfate _____ 2
Sodium lignin sulfonate _____ 3
Kerosene _____ 70

EXAMPLE 3

Preparation of a wettable powder

The following components are mixed intimately in conventional mixing or blending equipment and are then ground to a powder having an average particle size of less than about 50 microns. The finished powder is dispersed in water to give the desired concentration of active compound.

N-ethyl-3-bromo-4-methoxybenzylamine _____ 75.00
Fuller's earth _____ 22.75
Sodium lauryl sulfate _____ 2.00
Methyl cellulose _____ .25

EXAMPLE 4

Preparation of an oil-dispersible powder

The following components are blended and ground as described in the previous example to give a powder which can be dispersed in oil to form a spray containing the desired concentration of active compound.

N,N-diethyl-2-methoxy-5-bromobenzylamine _____ 70
Condensation product of diamylphenol with ethylene
  oxide _____ 4
Fuller's earth _____ 26

EXAMPLE 5

Preparation of a granular formulation

The following ingredients are mixed with sufficient water to form a paste, which is then extruded, dried, and ground to give granules, preferably from about 1/32 to 1/4 inch in diameter. The granules are applied with fertilizer spreader equipment or other conventional apparatus. The dextrin in this formulation serves as a binding agent.

N,N-dimethyl-2-methoxy-3-chlorobenzylamine _____ 10
Fuller's earth _____ 66
Dextrin _____ 20
Sodium lignin sulfonate _____ 3
Kerosene _____ 1

The compositions of this invention can be applied in any manner recognized by the art. The concentration of the active compounds in the compositions will vary greatly with the type of formulation and the purpose for which it is designed, but generally the compositions will comprise from about 0.05 to about 95 percent by weight of the active compounds. In a preferred embodiment of this invention, the compositions will comprise from about 5 to about 75 percent by weight of the active compound. The compositions can also comprise such additional substances as other pesticides, spreaders, adhesives, stickers, fertilizers, activators, synergists, and the like.

Weeds are undesirable plants in their growing where they are not wanted, having no economic value, and interfering with the production of cultivated crops or with the welfare of livestock. Many types of weeds are known, including annuals such as lambsquarters, yellow foxtail, French-weed, ryegrass, goose-grass, chickweed, and smartweed; biennials such as wild carrot, great burdock, mullein, round-leaved mallow, blue thistle, bull thistle, houndstongue, moth mullein, and purple star thistle; or perennials such as white cockle, perennial rye-grass, quackgrass, Johnson grass, Canada thistle, hedge bindweed, Bermuda grass, sheep sorrel, field chickweed, and winter-cress. Similarly, such weeds can be classified as broad-leaf or grassy weeds. It is economically desirable to control the growth of such weeds without damaging beneficial plants or livestock.

The compositions of this invention are particularly valuable for weed control because they are toxic to many species and groups of weeds while they are relatively nontoxic to many beneficial plants. The method of this invention for the control of weeds comprises contacting said weeds with a herbicidal composition comprising an inert carrier and as the essential active ingredient, in a quantity which is herbicidally toxic to said weeds, a compound $R''-(CH_2)_n-NRR'$.

The exact amount of compound required will depend on a variety of factors, including the hardiness of the particular weed species, weather, method of application, the kind of beneficial plants in the same area, and the like. Thus, while the application of up to only about one or two ounces of an active compound per acre can be sufficient for good control of a light infestation of weeds growing under adverse conditions, the application of one pound or more of active compound per acre can be required for good control of a dense infestation of hardy weeds growing under favorable conditions.

The present compositions are particularly effective in the control of the annual weeds, especially pigweed, crabgrass and wild mustard. These weeds can be effectively controlled by the application of a herbicidally effective amount. While this amount will vary with the weed species, equipment, specific identity of the chemical composition, terrain and other factors, applications of from about 2 to 10 pounds of active compound per acre are useful.

The herbicidal toxicity of the compositions of this invention can be illustrated by many of the established testing techniques known to the art. For example, emulsifiable concentrate compositions can be diluted with water to concentrations equivalent to 4 pounds of the active compound per acre. Duplicate paper pots filled with a sand and soil mixture are seeded with weeds; and immediately after seeding, the soil surface of each pot is sprayed with an appropriately diluted test solution. The weed growth is maintained under artificial lighting with irrigation provided by placing the porous pots in a small amount of water in stainless steel trays. The weeds are observed for a week to ten days; and the percent kill, injury, and stand reduction are recorded. The results indicate a high order of herbicidal activity of the compositions of this invention. Comparable pre-planting or post-emergence tests can also be used.

We claim:

1. The method for the control of weeds which comprises contacting said weeds with a herbicidal composition comprising an inert carrier and as the essential active ingredient, in a quantity which is toxic to said weeds, a compound of the formula

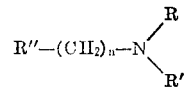

wherein $n$ is a whole number from 1 to 3; R and R' are selected from the group consisting of lower unsubstituted alkyl, lower unsubstituted alkenyl, lower monohydroxyalkyl, and hydrogen, a maximum of one of R and R'' being hydrogen; and R'' is a phenyl radical containing substituents selected from the group consisting of lower unsubstituted alkyl, lower unsubstituted alkoxy, lower unsubstituted alkylmercapto, halogen, mercapto, nitro, hydroxy, and amino, provided that one substituent on the phenyl radical is halogen when one lower unsubstituted alkoxy substituent is present on the phenyl ring, and provided that a maximum of three substituents on the phenyl radical are hydrogen when one substituent on the phenyl radical is nitro.

2. The method of claim 1, wherein R'' is a phenyl radical substituted with one lower unsubstituted alkoxy group and one halogen atom.

3. The method of claim 1, wherein R'' is a phenyl radical substituted with two nitro groups.

4. The method of claim 1, wherein R'' is a phenyl radical substituted with from one to two lower unsubstituted alkyl groups.

5. The method of claim 1, wherein R'' is a phenyl radial substituted with one lower unsubstituted alkylmercapto group.

6. The method of claim 1, wherein R'' is a phenyl radical substituted with from one to four halogen atoms.

7. The method of claim 1, wherein at least one of R and R' is lower unsubstituted alkyl.

8. The method of claim 1, wherein at least one of R and R' is lower unsubstituted alkenyl.

9. The method of claim 1, wherein the compound is N-butyl-2,4-dichlorobenzylamine.

10. The method of claim 1, wherein the compound is N,N-diethyl-m-methylbenzylamine.

11. The method of claim 1, wherein the compound is N-ethyl-3-bromo-4-methoxybenzylamine.

12. The method of claim 1, wherein the compound is N,N-diethyl-2-methoxy-5-nitrobenzylamine.

13. The method of claim 1, wherein the compound is N,N-dimethyl-m-methoxybenzylamine.

References Cited

UNITED STATES PATENTS 3,227,756  1/1966  Richter et al. _____ 71—2.3 X
3,227,760  1/1966  Richter et al. _____ 71—2.3 X JAMES O. THOMAS, JR., *Primary Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,406,024                                              October 15, 1968

Sidney B. Richter et al.

It is certified that error appears in the above identified patent and that said Letters Patent are hereby corrected as shown below:

Column 6, line 12, "$R''$ " should read -- $R'$ --.

Signed and sealed this 10th day of March 1970.

(SEAL)

Attest:

Edward M. Fletcher, Jr.                              WILLIAM E. SCHUYLER, JR.

Attesting Officer                                                  Commissioner of Patents